United States Patent
Yang et al.

(10) Patent No.: US 10,427,664 B2
(45) Date of Patent: Oct. 1, 2019

(54) METHOD AND SYSTEM FOR DETERMINING THE EFFECTIVENESS OF A BRAKE SYSTEM

(71) Applicant: FORD GLOBAL TECHNOLOGIES, LLC, Dearborn, MI (US)

(72) Inventors: Hsin-hsiang Yang, Ann Arbor, MI (US); Kwaku O. Prakah-Asante, Commerce Township, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 653 days.

(21) Appl. No.: 14/334,301

(22) Filed: Jul. 17, 2014

(65) Prior Publication Data
US 2016/0016574 A1   Jan. 21, 2016

(51) Int. Cl.
| | |
|---|---|
| B60T 17/22 | (2006.01) |
| G01L 5/28 | (2006.01) |
| B60T 13/66 | (2006.01) |
| B60T 8/88 | (2006.01) |

(52) U.S. Cl.
CPC .......... B60T 17/221 (2013.01); B60T 8/885 (2013.01); B60T 13/662 (2013.01); G01L 5/286 (2013.01); B60T 2270/406 (2013.01)

(58) Field of Classification Search
CPC .................................................... G01L 15/286
See application file for complete search history.

(56) References Cited

U.S. PATENT DOCUMENTS

| | | | |
|---|---|---|---|
| 5,299,452 A | 4/1994 | Caron et al. | |
| 5,371,677 A * | 12/1994 | Ehret | B60T 8/17552 303/147 |
| 5,647,647 A | 7/1997 | Kato et al. | |
| 6,332,354 B1 | 12/2001 | Lalor et al. | |
| 2003/0173826 A1* | 9/2003 | Tazoe | B60L 7/26 303/152 |
| 2005/0159871 A1* | 7/2005 | Nakamura | B60T 8/1755 701/70 |
| 2005/0261818 A1* | 11/2005 | Brown | B60T 7/22 701/70 |

(Continued)

FOREIGN PATENT DOCUMENTS

| | | |
|---|---|---|
| KR | 20030062535 A * | 7/2003 |
| KR | 10-0806084 B1 | 2/2008 |

OTHER PUBLICATIONS

Shaobo Li, Tohru Kawabe2, "Slip Suppression of Electric Vehicles Using Sliding Mode Control Method", Intelligent Control and Automation, 2013, 4, 327-334 http://dx.doi.org/10.4236/ica.2013.43038 Published Online Aug. 2013 (http://www.scirp.org/journal/ica).*

(Continued)

*Primary Examiner* — Matthew G Marini
(74) *Attorney, Agent, or Firm* — Jones Robb, PLLC; Raymond Coppiellie

(57) ABSTRACT

Systems and methods are described for monitoring the brake performance of a vehicle. A modeled deceleration of the vehicle may be calculated based on a master cylinder pressure of the vehicle brake system. The modeled deceleration may be compared to a measured deceleration of the vehicle. A notification may be initiated when a difference between the modeled deceleration and the measured deceleration exceeds a threshold.

17 Claims, 3 Drawing Sheets

(56) References Cited

U.S. PATENT DOCUMENTS

2008/0224842 A1    9/2008  Takano
2008/0236269 A1*  10/2008  Howell ................ B60T 17/221
                                                        73/121
2008/0265664 A1*  10/2008  Fulmer .................... B60T 8/38
                                                        303/113.4
2014/0188379 A1*   7/2014  Gostoli ................ G07C 5/085
                                                        701/123

OTHER PUBLICATIONS

J. K. Hedrick et al., "Brake System Modeling, Control and Integrated Brake/Throttle Switching: Phase I", California Path Research Report UCB-ITS-PRR-97-21, May 1997 ISSN 1055-1425, University of California, Berkeley.

* cited by examiner

METHOD AND SYSTEM FOR DETERMINING THE EFFECTIVENESS OF A BRAKE SYSTEM

TECHNICAL FIELD

The present disclosure relates generally to a method and an apparatus for determining the effectiveness of a brake system, particularly in a motor vehicle.

INTRODUCTION

In modern vehicles many systems have self-diagnostic functions that monitor system performance and issue warnings when the system is not functioning properly. Conventional braking systems do not have such self-diagnostic real-time warning systems for mechanical degradation. It can be beneficial to determine the effectiveness of the braking system of a vehicle. For example, wear on a braking system (e.g., wear to brake pads of a brake system) can cause degradation in brake performance. Accordingly, detecting such brake performance degradation and initiating an indication of such may ensure proper vehicle maintenance and safety.

SUMMARY

In accordance with various exemplary embodiments, the present disclosure provides systems and methods for monitoring the brake performance of a vehicle. A modeled deceleration of the vehicle may be calculated based on a master cylinder pressure of the vehicle brake system. The modeled deceleration may be compared to a measured deceleration of the vehicle. A notification may be initiated when a difference between the modeled deceleration and the measured deceleration exceeds a threshold.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
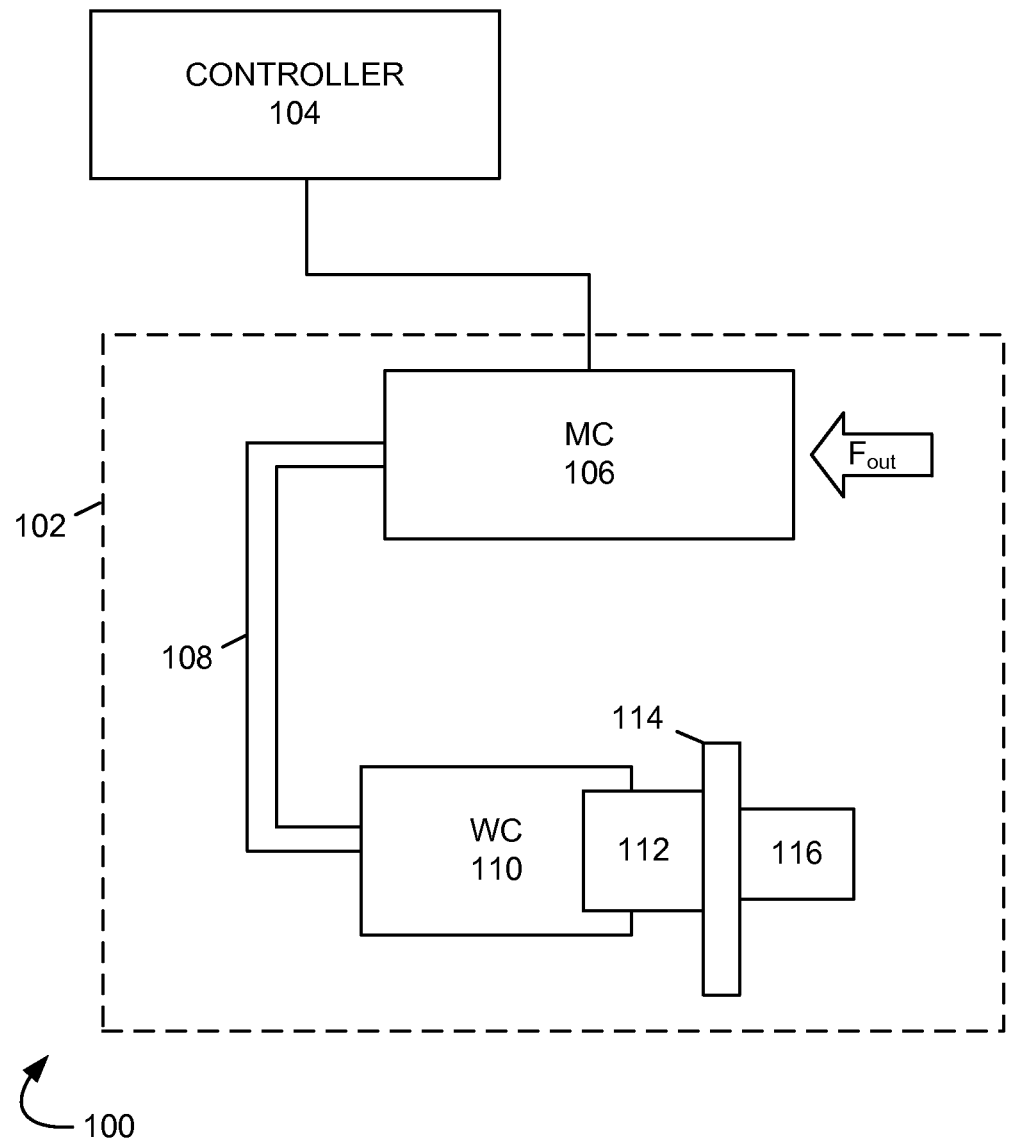
FIG. 1 shows schematic illustration of an apparatus for determining the effectiveness of a brake system in accordance with the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

The disclosure provides a method for determining the effectiveness of a brake system. In accordance with the present teachings, an exemplary embodiment may include or more sensors (e.g., a pressure sensor) for detecting brake fluid pressure. For example, a sensor for measuring pressure in a brake system's master cylinder may be provided in motor vehicles. Accordingly, the method of the disclosure can be implemented with existing sensors in certain embodiments.

In accordance with the present teachings, in an exemplary embodiment a controller may be used for determining the effectiveness of a brake system in order to increase the reliability of the determination. For example, the controller may determine brake effectiveness over a period of time (e.g., using a plurality of sensed brake pressures over the period of time), or may compare brake effectiveness to a criteria or threshold.

In accordance with the present teachings, in an exemplary embodiment the controller may determine brake system performance using the master cylinder pressure from the pressure sensor. For example, the controller may receive the master cylinder pressure and estimate a modeled deceleration based on the master cylinder pressure. In an embodiment, the controller may then determine brake system performance by comparing the modeled deceleration to a measured deceleration.

In accordance with the present teachings, in an exemplary embodiment vehicle measurement signals are also supplied to the controller as measurement variables. Such vehicle measurement signals may be, for example, signals from an anti-lock braking system (e.g., ABS), a power steering system, one or more computing devices that stores vehicle measurements (e.g., velocity, acceleration, and the like), and any other suitable vehicle component. The measurement variables may be stored by the controller and, in some instances, may be evaluated by the controller at a later time. Accordingly, use of measurement variables stored over a period of time may be utilized in order to more reliably determine brake effectiveness. For example, vehicle deceleration may be measured (e.g. by a sensor) or estimated (e.g., using measured velocity and time), and the deceleration may be provided to the controller.

FIG. 1 depicts a vehicle that may carry out the method according to an embodiment of the disclosure. Vehicle 100 may comprise a brake system 102 (e.g., partially illustrated in FIG. 1). The brake system may comprise a brake pedal (not illustrated) and a master cylinder 106. In accordance with the present teachings, in an exemplary embodiment a brake pedal may be engaged (e.g., by the driver) such that a force is applied against the master cylinder. The master cylinder contains brake fluid such that the force that acts upon the cylinder compresses the brake fluid (e.g., by shrinking the volume of the portion of the master cylinder that houses the brake fluid) and, thus, increases the master cylinder pressure.

Brake system 102 may further comprise brake lines 108 and a plurality of wheel cylinders 110, such that a brake line 108 couples master cylinder 106 to a wheel cylinder 108. Each wheel cylinder is associated with a corresponding wheel and brake disk. For purposes of modeling, the present disclosure utilizes a single circuit model that relies on a single brake line 108 and corresponding wheel cylinder 110, as illustrated. In accordance with the present teachings, in an exemplary embodiment the increased pressure in master cylinder 106 displaces the brake fluid and causes the brake fluid to flow into wheel cylinder 110 via brake line 108. Accordingly, wheel cylinder 110 experiences an increased pressure.

Brake system 102 also comprises brake pads 112 and 116, and brake disk 114. In accordance with the present teachings, in an exemplary embodiment a force is applied to brake pads 112 and 116 based on the increased pressure in wheel cylinder 110. Brake pads 112 and 116 then press against disk 114 causing a frictional force that slows the rotation of the wheel. Accordingly, the brake system may be used to decelerate vehicle 100.

In accordance with the present teachings, in an exemplary embodiment controller 104 may be used to determine the effectiveness of brake system 102. For example, when the brake pedal is depressed, a pressure sensor (not depicted) may sense the pressure of master cylinder 106. Controller 104 may receive this sensed pressure and determine a modeled deceleration based on the master cylinder sensed pressure. This modeled deceleration may then be compared to a measured deceleration. In accordance with the present teachings, in an exemplary embodiment this comparison may comprise the brake pad performance index (BPPI) for the brake system. The BPPI may indicate an effectiveness (e.g., a degree of wear or degradation) of brake pads 112 and 116. FIG. 1 illustrates a master cylinder and a wheel cylinder, however, embodiments may also include a plurality of wheel cylinders (e.g., four) attached to the one or more master cylinders without deviating from the scope of the disclosure. In addition, embodiments of the present disclosure may include one or more brake lines, brake pads, disks, and wheels. Accordingly, the BPPI may indicate the effectiveness of one or more brake pads associated with a particular wheel of a vehicle and/or an average for brake pads of a vehicle axle.

In accordance with the present teachings, in an exemplary embodiment, a pressure sensor may sense the master cylinder pressure (e.g., of master cylinder 106) and transmit the sensed pressure to controller 104. Controller 104 may then calculate a modeled deceleration of vehicle 100 based on the sensed pressure of the master cylinder. Controller 104 may then compare the modeled deceleration to a measured deceleration to determine a brake pad performance index (BPPI). For example, vehicle 100 may comprise an accelerometer (or some other velocity and/or acceleration sensor) that measures vehicle acceleration or vehicle velocity. In an example, vehicle acceleration may be determined using vehicle velocity based on a time over which a change in velocity occurs. The measured acceleration may comprise deceleration when the measured acceleration is negative. The measured vehicle acceleration may be supplied to controller 104.

In accordance with the present teachings, in an exemplary embodiment the determined BPPI may be compared to a criteria (e.g., threshold). A warning may be initiated, such as an indicator light, when the determined BPPI meets the criteria. In some examples, a plurality of BPPIs may be stored over a period of time. Here, periodically, the plurality of BPPIs may be averaged, and the average BPPI may be compared to the criteria.

Figure 2:
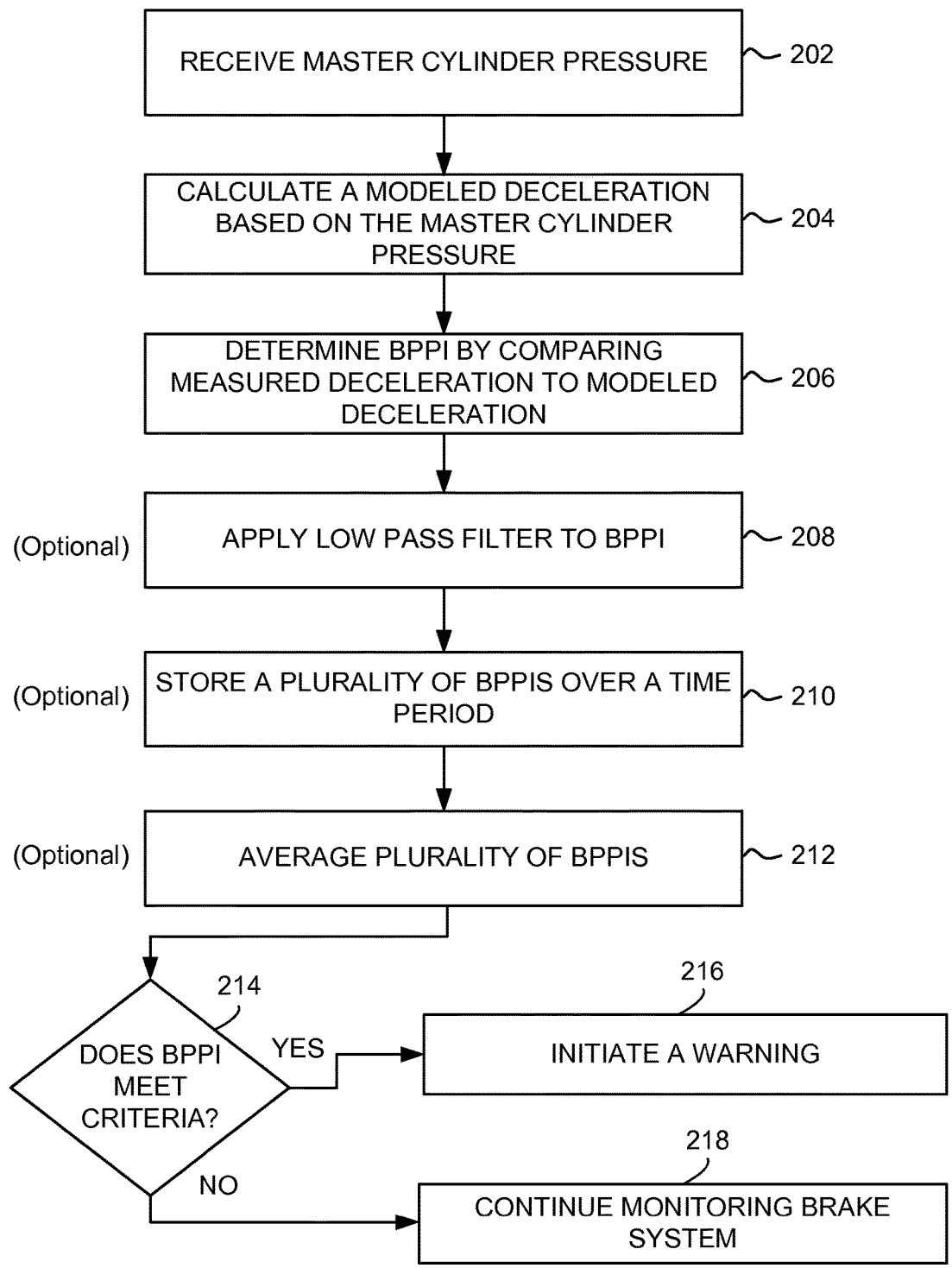
FIG. 2 shows an exemplary method for determining the effectiveness of a brake system in accordance with the present teachings.

FIG. 2 illustrates a method for determining the effectiveness of a brake system in accordance with an exemplary embodiment of the disclosure. In accordance with the present teachings, an exemplary embodiment of the method begins with receiving master cylinder pressure at step 202. For example, controller 104 may monitor master cylinder pressure from a pressure sensor that senses the pressure of master cylinder 106. In an embodiment, the sensed pressure may be monitored during a braking event (e.g., when the driver hits the brakes), continuously, periodically, or based on any other timing.

In an example, master cylinder pressure that exceeds a threshold may indicate a braking event. Accordingly, controller 104 may monitor the master cylinder pressure while the pressure exceeds the threshold. Therefore, controller 104 may determine the effectiveness of a brake system during a braking event. In accordance with the present teachings, in an exemplary embodiment, where master cylinder pressure exceeds a threshold, controller 104 may receive the master cylinder pressure and subsequently calculate a modeled deceleration of the vehicle (e.g., step 202). In another example, a braking event may be determined by a brake pressure sensor, a brake pedal, a brake position sensor, or any other suitable means.

In response to an initiation of a braking event, controller 104 may calculate a modeled deceleration at step 204. For example, controller 104 may use the master cylinder pressure monitored during the braking event to determine a wheel cylinder pressure. Controller 104 may then model a deceleration of vehicle 100 based on the determined wheel cylinder pressure. The method of FIG. 3 further describes modeling vehicle deceleration.

At step 206, a BPPI may be determined by comparing the modeled deceleration to a measured deceleration. For example, vehicle 100 may comprise an accelerometer (or some other velocity and/or acceleration sensor) that measures vehicle deceleration or vehicle velocity. In an example, vehicle deceleration may be determined using vehicle velocity based on a time over which a change in velocity occurs. The measured vehicle deceleration over the braking event may be supplied to controller 104 or controller 104 can calculate the deceleration based on other inputs (e.g., measured velocity and time). Accordingly, the modeled deceleration over the braking event determined by controller 104 may be compared to the measured deceleration over the braking event received by controller 104.

In accordance with the present teachings, in an exemplary embodiment the BPPI may be determined based on a comparison that comprises:

$$BPPI = \frac{\text{Modeled Deceleration} - \text{Measured Deceleration}}{\text{Modeled Deceleration}} \qquad (1)$$

Accordingly, the comparison may comprise a ratio of the difference between the modeled deceleration and the measured deceleration over the modeled deceleration. Here, the BPPI may indicate a deterioration in brake system performance (e.g., wear on brake pads 112 and 116). A BPPI of zero indicates that the brake system is performing according to the model. The greater the value of the BPPI the greater the indicated deterioration of the brake system performance (e.g., greater the indicated wear on brake pads 112 and 116).

In optional step 208, a low pass filter may be applied to the BPPI. For example, a low pass filter may be applied to the determined BPPI over the braking event. In accordance with the present teachings, an exemplary embodiment the low pass filter may be used to smooth the determined BPPI such that extraneous factors (e.g., wind conditions, road conditions, and the like) may be filtered out.

In optional step 210, the BPPI may be stored such that a plurality of BPPIs are stored over time. For example, a plurality of BPPIs may be stored for a plurality of braking events over a period of time. Controller 104 may store the plurality of BPPIs. Here, the plurality of BPPIs may represent the effectiveness of the braking system over a period of time. The period of time may comprise hours, days, weeks, and the like, or may comprise a number of braking events (e.g., 1, 2, 5, and the like).

In optional step 212, the plurality of BPPIs may be averaged. For example, where a plurality of BPPIs are stored over a plurality of braking events, an average of the BPPIs may represent the average effectiveness of the braking system over the period of time. Controller 104 may average the plurality of BPPIs.

In step 214, it may be determined whether the BPPI meets a criteria. For example, the BPPI may indicate a deterioration in the brake system performance (e.g., wear on the brake pad). Accordingly, a criteria may comprise a threshold number (e.g., 20% difference, 25% difference, and the like). When the BPPI is greater than or equal to the threshold number, the BPPI may meet the criteria.

In step 216, when the BPPI meets the criteria, a warning may be initiated. For example, an indicator light that indicates wear on the brake may be lit. In another example, an audible sound may be emitted such that the driver is warned of the deterioration in brake system performance.

In accordance with the present teachings, in an exemplary embodiment the BPPI may be compared to a plurality of criteria. For example, where a BPPI meets a first criteria (e.g., first threshold), a first indicator may be initiated, and when the BPPI meets a second criteria (e.g., second threshold), a second indicator may be initiated. In such an example, the first indicator may indicate medium deterioration in the brake system performance (e.g., medium wear on the brake pad) and the second indicator may indicate high deterioration in the brake system performance (e.g., high wear on the brake pad). In another example, the first indicator may indicate that one or more brake pads should be repaired/replaced in the medium term and the second indicator may indicate that one or more brake pads should be repaired/replaced in the short term.

Conversely, in step 218, when the BPPI does not meet a criteria, the brake system may continue to be monitored. For example, controller 104 may continue to monitor the brake system. Here, in accordance with the present teachings, in an exemplary embodiment controller 104 may perform the method of FIG. 2 again based on a time period, one or more braking events, or any other suitable period.

Figure 3:
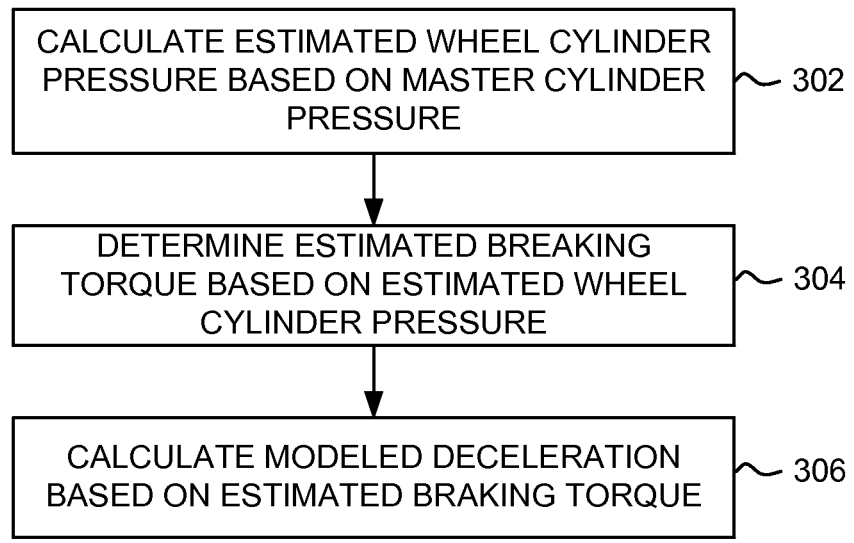
FIG. 3 shows an exemplary method for modeling brake performance in accordance with the present teachings.

FIG. 3 illustrates a method for modeling brake performance in accordance with an exemplary embodiment of the disclosure. For example, step 204 of FIG. 2 may further comprise the method of FIG. 3. In accordance with the present teachings, an exemplary embodiment of the method begins with calculating an estimated wheel cylinder pressure based on the received master cylinder pressure at step 302. For example, controller 104 may receive the master cylinder pressure from a pressure sensor, and may further calculate the wheel cylinder pressure (e.g., of wheel cylinder 110).

In accordance with the present teachings, an exemplary embodiment may include a brake event where brake fluid is displaced from master cylinder 106. Here the volume of the displaced brake fluid may be describes by Bernouli's equation:

$$\dot{V} = \sigma \cdot C_q \cdot \sqrt{|P_{mc} - P_w|} \qquad (2)$$

where $$\sigma = \text{sgn}(P_{mc} - P_w) \qquad (3)$$

In the above equations, $\dot{V}$ comprises the displaced volume of brake fluid in the brake system (e.g., brake lines), $C_q$ comprises the effective flow coefficient, $P_{mc}$ comprises the master cylinder pressure, $P_w$ comprises the wheel cylinder pressure, and $\sigma$ comprises the direction of flow (e.g., of the brake fluid). Based on the above equations, and the known dimensions of the brake system (e.g., brake cylinder dimensions), the relationship between $P_w$ and the displaced brake fluid volume may be described as:

$$P_w = p_3 \cdot V^3 + p_2 \cdot V^2 + p_1 \cdot V + p_0 \qquad (4)$$

In the above equation, the polynomial P (e.g., $p_3$, $p_2$, $p_1$, and $p_0$) may be determined by experimentation using a brake system similar to brake system 102 and a polynomial modeling algorithm. Accordingly, using the master cylinder pressure $P_{mc}$, the wheel cylinder pressure $P_w$ may be determined using the displaced volume of the brake fluid.

In an embodiment, the wheel cylinder pressure may be calculated as an iterated process. For example, the calculation may begin with a zero $P_w$ and a zero $\dot{V}$, or volume of displaced brake fluid. When the master cylinder pressure $P_{mc}$ builds, the volume change $\dot{V}$ can be calculated. Subsequently, an equation $V_i = V_{i-1} + \dot{V}_i * \text{time}_{step}$ is updated to determine the volume of brake fluid in the brake system, where i denotes a particular iteration. In an embodiment, based on iterations of the above, an updated V can be used in equation 4 to calculate an updated $P_w$.

For example, at an initializing step 0, the values for $P_{mc}(0)$, $P_w(0)$, $\dot{V}(0)$, and $V(0)$ may all be 0, or some other known initial value. At iteration step 1, $P_{mc}(1)$ may build based on the driver engaging the brake pedal, and $\dot{V}(1)$ may be calculated based on equation 2, where $\dot{V}(1) = \sigma \cdot C_q \cdot \sqrt{|P_{mc}(1) - P_w(0)|}$. After solving for $\dot{V}(1)$, $V(1)$, or the volume of brake fluid in the brake system, may be calculated based on $V(1) = V(0) + \dot{V}(1) * \text{time}_{step}$. Finally, $P_w(1)$ may be determined based on equation 4, $P_w(1) = p_3 \cdot V(1)^3 + p_2 \cdot V(1)^2 + p_1 \cdot V(1) + p_0$. Next, the values for $P_w(1)$, $\dot{V}(1)$, and $V(1)$ have been determined, and the process may iterate to step 2 when $P_{mc}(2)$ is determined (e.g., sensed).

In step 304, an estimated breaking torque may be determined based on the calculated wheel cylinder pressure. For example, controller 104 may calculate the wheel cylinder pressure using the master cylinder pressure, and may further estimate the breaking torque of the brake system.

In accordance with the present teachings, an exemplary the relationship between the wheel cylinder pressure and the breaking torque may be described as:

$$\tau_b = \begin{cases} K_b(P_w - P_{po}) & P_w > P_{po} \\ 0 & \text{otherwise} \end{cases} \quad (5)$$

In the above equation, $\tau_b$ comprises the breaking torque, $K_b$ comprises a brake pad friction coefficient (e.g., based on the brake pad type, dimensions, thickness, material, and the like), $P_w$ comprises the wheel cylinder pressure, and $P_{po}$ comprises an initial pressure within the wheel cylinder (e.g., a predetermined constant). Accordingly, using the wheel cylinder pressure $P_w$, the breaking torque may be determined.

In step 306, a modeled deceleration may be calculated based on the estimated breaking torque. For example, controller 104 may estimate the braking torque using the wheel cylinder pressure, and may further estimate the deceleration of vehicle 100.

In accordance with the present teachings, an exemplary the relationship between the breaking torque and the deceleration may be described as:

$$a = \frac{T_e - C \cdot v^2 \cdot r - r \cdot R - \tau_b}{M \cdot r} \quad (6)$$

In the above equation, $T_e$ comprises engine torque, or engine drag, (e.g., from a sensor of vehicle 100 or may comprise a predetermined constant), C comprises an aerodynamic drag in the longitudinal direction (e.g., based on experimental results from a vehicle similar to vehicle 100, predetermined constant), v comprises speed of vehicle 100, r comprises the wheel diameter for wheels of vehicle 100, R comprises rolling resistance, such as from the tires and transmission system (e.g., predetermined constant), M comprises the mass of vehicle 100, and $\tau_b$ comprises the estimated breaking torque. For example, the modeled deceleration may be based on the vehicle type (e.g., mass for the vehicle type, rolling resistance for the vehicle type, aerodynamic drag for the vehicle type, and the like) and the brake pad type (e.g., dimensions, thickness, material, and the like).

Accordingly, in certain embodiments of the present disclosure, controller 104 may: determine wheel cylinder pressure from a monitored master cylinder pressure; estimate braking torque based on wheel cylinder pressure; and model deceleration based on the estimated braking torque.

The methods illustrated in FIGS. 2 and 3 can be performed in one or more devices of system 100. For example, the method can be performed by controller 104, or any outer suitable device. Controller 104 can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. Controller 104 can further include a processing element such as a microprocessor or other circuitry to retrieve and execute software from the storage element. Controller 104 can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for monitoring brake pad wear, comprising:
    receiving, from a first sensor, during application of pressure via a master cylinder of a brake system, a signal indicative of brake pad wear;
    calculating a modeled deceleration of a vehicle based on the signal, the calculating comprising:
        determining an estimated braking torque based on the signal, and
        calculating a modeled deceleration of the vehicle based on the estimated braking torque;
    receiving a measured deceleration from a second sensor;

determining brake pad wear based on a ratio of a difference between the modeled deceleration and the measured deceleration to the modeled deceleration; and initiating a brake pad wear notification when the ratio exceeds a threshold.

2. The method of claim 1, wherein determining the estimated braking torque comprises:

calculating an estimated wheel cylinder pressure based on the signal; and determining the estimated braking torque based on the estimated wheel cylinder pressure.

3. The method of claim 1, wherein
the ratio of the difference between the modeled deceleration and the measured deceleration to the modeled deceleration comprises a brake pad wear index.

4. The method of claim 3, further comprising applying a low pass filter to the brake pad wear index.

5. The method of claim 4, further comprising storing a plurality of determined brake pad wear indexes over a period of time, wherein the low pass filter has been applied to each stored brake pad wear index.

6. The method of claim 5, further comprising determining an average of the plurality of determined brake pad wear indexes, wherein initiating the brake pad wear notification further comprises comparing the average of the plurality of determined brake pad wear indexes to the threshold.

7. The method of claim 3, further comprising initiating a first brake pad wear notification when the brake pad wear index exceeds the threshold and a second brake pad wear notification when the brake pad wear index exceeds a second threshold.

8. The method of claim 7, wherein the first and second brake pad wear notifications indicate brake pad deterioration such that the second brake pad wear notification indicates a greater deterioration than the first brake pad wear notification.

9. The method of claim 1, wherein the modeled deceleration is based on one or more of a vehicle type and a brake pad type for brake pads of the vehicle brake system.

10. The method of claim 1, wherein the modeled deceleration is calculated in response to a braking event in real-time.

11. A system for monitoring brake pad wear of a vehicle, comprising:
a vehicle;
a controller;
a first sensor configured to output to the controller a signal indicative of brake pad wear during application of pressure via a master cylinder of a vehicle brake system; and
a second sensor configured to output to the controller a measured deceleration of the vehicle;
wherein the controller is configured to:
calculate a modeled deceleration of the vehicle based on the received signal, the calculating comprising:
determining an estimated braking torque based on the signal, and
calculating a modeled deceleration of the vehicle based on the estimated braking torque;
determine a brake pad wear index as a ratio of a difference between the modeled deceleration and the measured deceleration to the modeled deceleration; and
initiate a brake pad wear notification when the determined brake pad wear index exceeds a threshold.

12. The system of claim 11, wherein determining the estimated braking torque comprises:
calculating an estimated wheel cylinder pressure based on the signal; and
determining the estimated braking torque based on the estimated wheel cylinder pressure.

13. The system of claim 11, wherein the controller is further configured to apply a low pass filter to the determined brake pad wear index.

14. The system of claim 13, wherein the controller is further configured to store a plurality of determined brake pad wear indexes over a period of time, wherein the low pass filter has been applied to each stored brake pad wear index.

15. The system of claim 14, further comprising determining an average of the plurality of determined brake pad wear indexes, wherein initiating the brake pad wear notification further comprises comparing the average of the plurality of determined brake pad wear indexes to the threshold.

16. The system of claim 11, wherein the controller is further configured to initiate the brake pad wear notification when the determined brake pad wear index exceeds the threshold and a second brake pad wear notification when the determined brake pad wear index exceeds a second threshold.

17. The system of claim 11, wherein the modeled deceleration is calculated in response to a braking event in real-time.

* * * * *